United States Patent

Kuk et al.

(10) Patent No.: US 9,261,721 B2
(45) Date of Patent: Feb. 16, 2016

(54) DISPLAY APPARATUS

(71) Applicant: Samsung Display Co., Ltd., Yongin, Gyeonggi-Do (KR)

(72) Inventors: Seung-Won Kuk, Asan-si (KR); Chunghui Lee, Cheongju-si (KR); Joonseok Ahn, Suwon-si (KR); Jeesu Park, Hwaseong-si (KR)

(73) Assignee: SAMSUNG DISPLAY CO., LTD. (KR)

( * ) Notice: Subject to any disclaimer, the term of this patent is extended or adjusted under 35 U.S.C. 154(b) by 55 days.

(21) Appl. No.: 14/302,614

(22) Filed: Jun. 12, 2014

(65) Prior Publication Data

US 2015/0168766 A1   Jun. 18, 2015

(30) Foreign Application Priority Data

Dec. 17, 2013   (KR) .................. 10-2013-0157379

(51) Int. Cl.
*G02F 1/1333* (2006.01)
*G02F 1/1335* (2006.01)

(52) U.S. Cl.
CPC ........ *G02F 1/133308* (2013.01); *G02F 1/1336* (2013.01)

(58) Field of Classification Search
CPC ................................................ G02F 1/133308
See application file for complete search history.

(56) References Cited

U.S. PATENT DOCUMENTS

| 7,466,379 | B2 | 12/2008 | Sakata et al. |
| 8,243,227 | B2 | 8/2012 | Oohira |
| 9,077,791 | B2 * | 7/2015 | Jeong et al. |
| 2012/0113369 | A1 | 5/2012 | Kim et al. |
| 2012/0140141 | A1 | 6/2012 | Lee et al. |
| 2012/0268686 | A1 | 10/2012 | Lee et al. |
| 2013/0300974 | A1 * | 11/2013 | Yoshimoto .............. 349/58 |
| 2013/0342784 | A1 * | 12/2013 | Watanabe .............. 349/58 |
| 2014/0118911 | A1 * | 5/2014 | Tang et al. .......... 361/679.01 |
| 2014/0253823 | A1 * | 9/2014 | An et al. ................ 349/12 |

FOREIGN PATENT DOCUMENTS

| JP | 2006-330127 A | 12/2006 |
| KR | 1020080067744 A | 7/2008 |
| KR | 1020120004648 A | 1/2012 |
| KR | 1020120049066 A | 5/2012 |
| KR | 1020120118372 A | 10/2012 |
| KR | 1020130046240 A | 5/2013 |

* cited by examiner

*Primary Examiner* — Timothy L Rude
(74) *Attorney, Agent, or Firm* — Cantor Colburn LLP

(57) ABSTRACT

A display apparatus includes a display panel, a backlight unit, a fixing sheet and a coupling unit. The display panel includes an image display surface upon which an image is displayed, and a bottom surface opposing the image display surface. The backlight unit is under the display panel, and generates and provides light to the display panel. The fixing sheet includes a base film and a wing part. The base film is entirely attached to the bottom surface of the display panel and a top surface of the backlight unit. The wing part extends from an edge of the base film and is fixed to a side surface of the backlight unit. The coupling member couples the wing part to the side surface of the backlight unit.

16 Claims, 3 Drawing Sheets

DISPLAY APPARATUS

This application claims priority to Korean Patent Application No. 10-2013-0157379, filed on Dec. 17, 2013, and all the benefits accruing therefrom under 35 U.S.C. §119, the entire contents of which are hereby incorporated by reference.

BACKGROUND (1) Field

The disclosure herein relates to a display apparatus, and more particularly, to a display apparatus capable of omitting a top chassis.

(2) Description of the Related Art

Flat panel display devices such as liquid crystal display devices ("LCDs"), plasma display panels ("PDPs"), field emission display devices ("FEDs"), light emitting diode display devices ("LEDs") and organic light emitting diode display devices ("OLEDs") are being developed.

In such a flat panel display device, the LCDs have firm markets due to advantages in mass-production technologies, availability of a driving unit, relatively low power consumption and thin thickness, and realization of high-definition and a relatively large screen, and also are being applied to various fields.

According to the typical LCDs, since an area enough to support a weight of a liquid crystal panel is necessary, such an LCD has a limitation in reducing in bezel area. As a result, an outer edge of a screen is covered by a case top, and thus satisfaction in outer appearance design of the LCD is reduced.

SUMMARY

With research and development ("R&D") in terms of technologies of flat panel display device, needs for R&D regarding product designs that can appeal to consumers are being emphasized. Therefore, efforts are continuously made to manufacture a display device having a relatively thin thickness. In addition, to satisfy needs for design or aesthetics of the display device, a relatively narrow bezel type LCD of which an outer edge is reduced in peripheral area and a borderless type LCD of which an outer edge is removed, is being researched.

One or more exemplary embodiment of the invention provides a display apparatus that is reduced in thickness and bezel size, and in manufacturing cost, by omitting a top chassis.

An exemplary embodiment of the invention provides a display apparatus include a display panel, a backlight unit, a fixing sheet and a coupling unit. The display panel includes an image display surface on which an image is displayed, and a bottom surface opposite to the image display surface. The backlight unit is under the display panel, and generates and provides light to the display panel. The fixing sheet includes a base film and a wing part. The base film is entirely attached to the bottom surface of the display panel and a top surface of the backlight unit. The wing part extends from an edge of the base film and is fixed to a side surface of the backlight unit. The coupling member couples the wing part to the side surface of the backlight unit.

In an exemplary embodiment, the fixing sheet may include a transparent flexible film. The base film may have a rectangular shape the same as that of the bottom surface of the display panel in a plan view. The wing part may extend from each of a plurality of sides of the base film in a direction perpendicular to each side of the base film.

In an exemplary embodiment, the backlight unit may include a bottom chassis, a middle mold, a light guide plate and a light source. The bottom chassis may include a bottom portion, and a sidewall extending from an edge of the bottom portion. The middle mold may be coupled to an outer portion of the bottom chassis and support the display panel. The light guide plate may be accommodated in the bottom chassis, guide incident light toward the display panel and emit the light toward the display panel. The light source may generate and provide the light to the light guide plate.

In an exemplary embodiment, the display apparatus may further include a stiffener between the wing part and the middle mold. The stiffener may include polycarbonate.

In an exemplary embodiment, the coupling member may pass through the wing part, and be fixed to the middle mold or be fixed to the middle mold and the sidewall. The coupling member may include a rivet or a screw.

In an exemplary embodiment, the coupling member may include an adhesion film between the stiffener and the middle mold.

BRIEF DESCRIPTION OF THE DRAWINGS

The accompanying drawings are included to provide a further understanding of the invention, and are incorporated in and constitute a part of this specification. The drawings illustrate exemplary embodiments of the invention and, together with the description, serve to explain principles of the invention. In the drawings.

DETAILED DESCRIPTION

Figure 1:
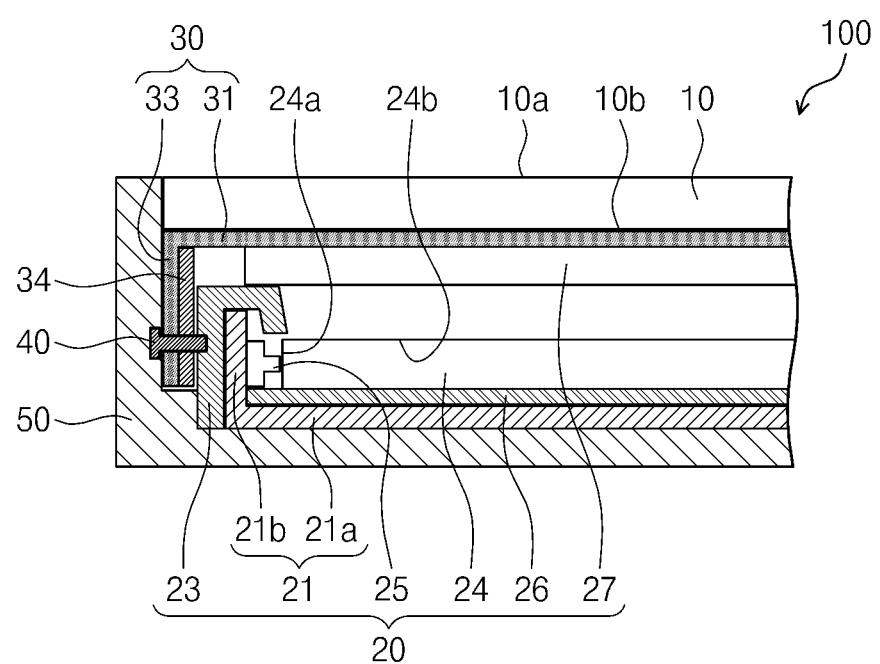
FIG. 1 is a cross-sectional view of an exemplary embodiment of a display apparatus according to the invention.

Objects, other objects, features, and advantages of the invention will be clarified through following exemplary embodiments described with reference to the accompanying drawings. The invention may, however, be embodied in different forms and should not be construed as limited to the exemplary embodiments set forth herein. Rather, these exemplary embodiments are provided so that this disclosure will be thorough and complete, and will fully convey the scope of the invention to those skilled in the art.

It will be understood that when an element or layer is referred to as being "on," "connected to" or "coupled to" another element or layer, the element or layer can be directly on, connected or coupled to another element or layer or intervening elements or layers. In contrast, when an element is referred to as being "directly on," "directly connected to" or "directly coupled to" another element or layer, there are no intervening elements or layers present. As used herein, connected may refer to elements being physically and/or electrically connected to each other. Like numbers refer to like elements throughout. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the invention.

Spatially relative terms, such as "below," "lower," "under," "above," "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "below" relative to other elements or features would then be oriented "above" relative to the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises," "comprising," "includes" and/or "including," when used in this specification, specify the presence of stated features, integers, operations, elements, and/or components, but do not preclude the presence or addition of one or more other features, integers, steps, operations, elements, components, and/or groups thereof.

Embodiments of the invention are described herein with reference to cross-section illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, the invention will be described in detail with reference to the accompanying drawings.

FIG. 1 is a cross-sectional view of an exemplary embodiment of a display apparatus according to the invention.

Referring to FIG. 1, the display apparatus 100 includes a display panel 10, a backlight unit 20, a fixing sheet 30, a coupling member 40 and a side cover 50.

The display panel 10 displays an image. The display panel 10 may include a non-self-emission type display panel, but may not include a self-light-emission type display panel such as an organic light emitting display ("OLED") panel. Although the display panel 10 may include various non-self-emission type display panels, a liquid crystal display ("LCD") panel will now be exemplified as the display panel 10.

The display panel 10 includes a top surface 10a on which an image is displayed, and a bottom surface 10b that is opposite to the top surface 10a. An entire of the image display surface (e.g., the top surface 10a) of the display panel 10 is exposed and available to display an image.

The display panel 10 may include a first substrate (not shown), a second substrate (not shown) facing the first substrate, and a liquid crystal layer disposed between the first and second substrates. The liquid crystal layer may include a plurality of liquid crystal molecules of which an arrangement is changed according to an electric field formed between the first and second substrates.

Although not shown, the display apparatus 100 may further include a pair of polarizing plates (not shown) disposed at upper and lower portions of the display panel 10, respectively.

The backlight unit 20 is disposed under the display panel 10 to provide light to the display panel 10.

The backlight unit 20 may include a bottom chassis 21, a middle mold 23, a light guide plate 24, a light source 25, an extrusion bar 26 and optical sheets 27.

The bottom chassis 21 includes a bottom surface portion 21a, and a sidewall 21b extending from an edge of the bottom surface portion 21a. The bottom chassis 21 includes a receiving space that is defined by the bottom surface portion 21a and the side wall 21b. The light guiding plate 24, the light source 25 and the extrusion bar 26 may be received in the receiving space of the bottom chassis 21.

The middle mold 23 may be coupled to an outer portion of the bottom chassis 21. In detail, the middle mold 23 may extend along the sidewall 21b and be bent toward the receiving space from an upper portion the side wall 21b. The middle mold 23 may support the display panel 10 and the optical sheets 27.

Although the bottom chassis 21 and the middle mold 23 are separately provided in an exemplary embodiment of the invention, the invention is not limited thereto. In an alternative exemplary embodiment, for example, the bottom chassis 21 and the middle mold 23 may be integral so as to form a single, unitary, indivisible bottom chassis-middle mold member.

The light guide plate 24 may be disposed within the receiving space. The light guide plate 24 may be disposed above the bottom surface portion 21a. The light guide plate 24 may include an incidence surface 24a and an emission surface 24b. The incidence surface 24a may be defined as a surface into which light provided from the light source 25 is incident, and the emission surface 24b may be defined as a surface through which the light incident from the incidence surface 24a is guided and emitted to the display panel 10.

The light source 25 may be disposed adjacent to the incidence surface 24a. The light source 25 is disposed between the sidewall 21b of the bottom chassis 21 and the incidence surface 24a of the light guide plate 24 to provide light to the incidence surface 24a. The light source 25 may be provided in plurality, and the plurality of light sources 25 may be spaced apart from each other along an extended direction of the sidewall 21b of the bottom chassis 21.

The light source 25 may include a cold cathode fluorescent lamp ("CCFL"), an external electrode fluorescent lamp ("EEFL") and/or a light emitting diode ("LED").

The extrusion bar 26 may be disposed on the bottom surface portion 21a of the bottom chassis 21 to fix the light source 25 within the backlight unit 20. Although not shown, a printed circuit board (not shown) that provides a power to the light source 25 may be disposed between the extrusion bar 26 and the light source 25.

The optical sheets 27 are disposed above the light guiding plate 24 so as to improve efficiency of the light that is emitted from the emission surface 24b of the light guiding plate 24. In detail, the optical sheets 27 may be disposed on the middle mold 23. The optical sheets 27 may include a diffusion sheet, a light collection sheet and/or a protection sheet. The diffusion sheet may diffuse the incident light. The light collection sheet may increase brightness of the light diffused from the diffusion sheet. The protection sheet may protect the light collection sheet and secure a viewing angle of the display apparatus 100.

Although not shown, the backlight unit 20 may further include a reflection sheet (not shown) disposed under the light guiding plate 24. The reflection sheet may re-reflect most of the incident light toward the light guiding plate 24.

The fixing sheet 30 may be disposed between the display panel 10 and the backlight unit 20 to attach the display panel 10 to the backlight unit 20. The fixing sheet 30 may be fixed to top and side surfaces of the backlight unit 20. In detail, the fixing sheet 30 may be disposed between the display panel 10 and optical sheets 27 to be adhered to each of the display panel 10 and the optical sheets 27.

The fixing sheet 30 includes a transparent flexible film which is configured to transmit most of the light that is provided from the backlight unit 20, to the display panel 10.

Although not shown, an adhesive such as an optically clear adhesive ("OCA") and an optical clear resin ("OCR") may be disposed between the fixing sheet 30 and the display panel 10 and/or between the fixing sheet 30 and the optical sheets 27. Also, the fixing sheet 30 is attached to the middle mold 23 and the bottom chassis 21 of the backlight unit 20, and its detailed descriptions will be described.

The coupling member 40 may be coupled to the sidewall of the backlight unit 20. The coupling member 40 may fix the fixing sheet 30 and the middle mold 23 to each other, or fix the fixing sheet 30, the middle mold 23 and the bottom chassis 21 to each other, and detailed descriptions will be described later.

The side cover 50 is configured to surround a side surface of the display panel 10, a side surface of the backlight unit 20 and a portion of the bottom surface of the backlight unit 20. The side cover 50 exposes an entire of the image display surface (e.g., the top surface 10a) of the display panel. The side cover 50 may define an outer appearance of the display apparatus 100, except for an image display surface (the top surface 10a of the display panel 10) of the display apparatus 100. Also, the side cover 50 may protect the display panel 10 and the backlight unit 20 from an external impact.

Figure 2:
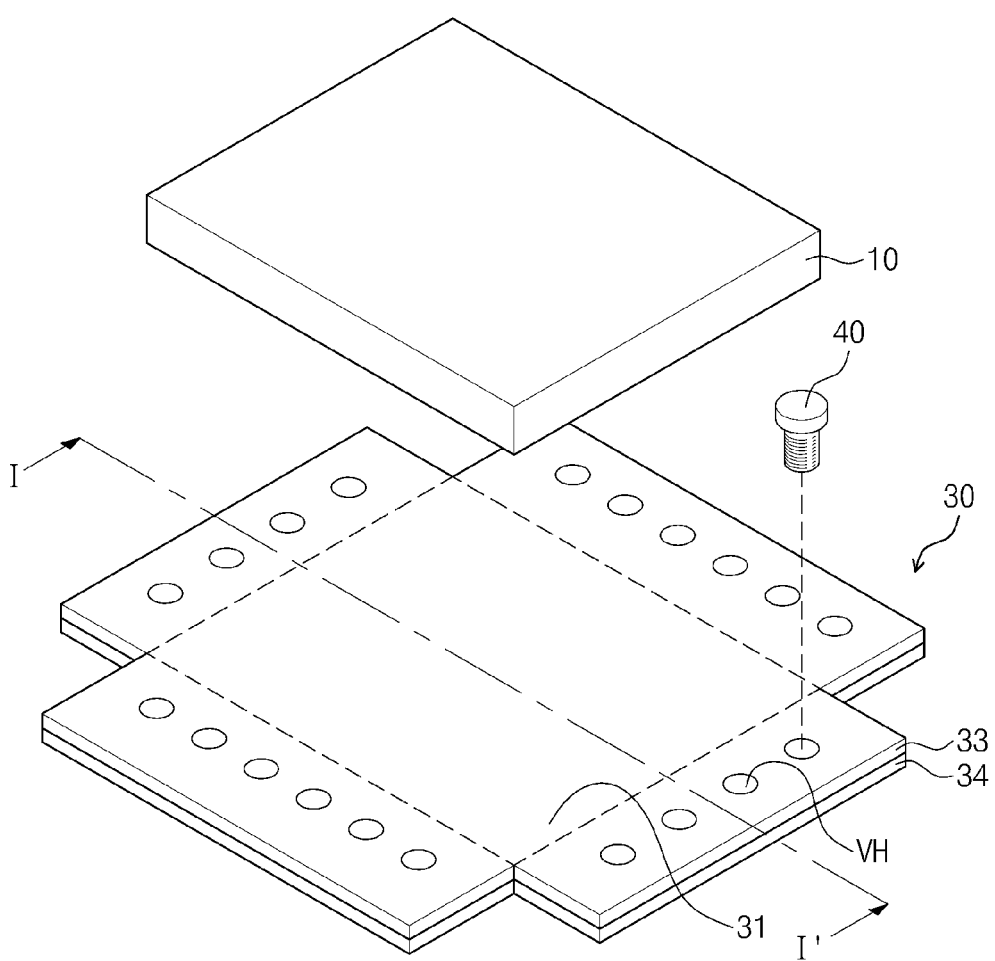
FIG. 2 is an exploded perspective view of an exemplary embodiment of a display panel, a fixing sheet and a coupling member in FIG. 1.
Figure 3:
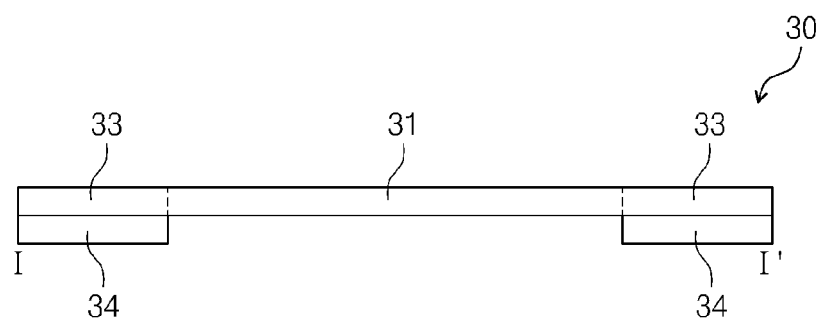
FIG. 3 is a cross-sectional view of the fixing sheet, taken along line I-I' of FIG. 2.

FIG. 2 is an exploded perspective view of an exemplary embodiment of a display panel, a fixing sheet and a coupling member in FIG. 1, and FIG. 3 is a cross-sectional view of the fixing sheet, taken along line I-I' of FIG. 2.

Referring to FIGS. 1 to 3, the fixing sheet 30 includes a base film 31 and a wing part 33.

The base film 31 may be entirely attached to the bottom surface 10b of the display panel 10 and the top surface of the backlight unit 20. The base film 31 may have the same shape as the bottom surface 10b of the display panel 10. In FIG. 2, the display panel 10 and the base film 31 each of which has a rectangular plate shape in a top plan view are illustrated as an example, and are indicated by dotted lines. The base film 31 may be attached to the bottom surface 10b of the display panel 10 and the top surface of the optical sheet 27 through the adhesive (not shown). The base film 31 and the wing part 33 may form a single, unitary, indivisible fixing sheet 30.

The wing part 33 may extend from each of a plurality of sides of the base film 31 in a direction perpendicular to each of the sides of the base film 31 and be fixed to the side surface of the backlight unit 20. Although the wing part 33 is disposed on each of four sides of the base film 31 in FIG. 2, the invention is not limited thereto. In an alternative exemplary embodiment, for example, the wing part 33 may be extended from each of two sides, which are facing each other, among four sides of the base film 31.

The wing part 33 may bent downward from the display panel 10 in a cross-sectional thickness direction, and be fixed to the middle mold 23.

The fixing sheet 30 may further include stiffener 34 corresponding to the wing part 33, and not corresponding to the base film 31. The stiffener 34 may be provided between the wing part 33 and the middle mold 23. Since the wing part 33 includes a flexible film, the wing part 33 may be torn while the coupling member 40 passes through at thickness of the wing part 33. Also, the wing part 33 and the middle mold 23 may not be tightly fixed to each other by the coupling member 40. The stiffener 34 may be attached to the wing part 33 to reduce or effectively prevent tearing of the wing part 33 and to firmly fix the wing part 33 and the middle mold 23 to each other. The stiffener 34 may include polycarbonate ("PC").

The coupling member 40 may fix the wing part 33 to the middle mold 23 and/or fix the middle mold 23 to the sidewall 21b. The coupling member 40 may be inserted along a via hole VH defined in the wing part 33 and the stiffener 34 and be fixed to the middle mold 33 by the coupling member 40 extended through the via hole VH.

A plurality of coupling members 40 may be coupled to the wing part 33 along an extensional direction of the wing part 33 (an extensional direction of each side of the base film 31). In FIG. 2, four via holes VH are defined in respective portions of the wing part 33 disposed on each of short sides of the base film 31, and six via holes VH are defined in respective portions of the wing part 33 disposed on each of long sides of the base film 31. The number of coupling members 40 may correspond to that of via holes VH. However, the invention is not limited to the number of via holes VH. In exemplary embodiments, for example, and the via hole VH and the coupling member 40 may vary in numbers.

The coupling member 40 may be a rivet or screw.

In a general display apparatus, a top chassis is coupled to the display panel, the middle mold and the bottom chassis and is overlaps a portion of the image display surface of the display panel. Substantially, the top chassis is configured to fix the display panel and the backlight unit to each other. However, the general display apparatus increases in cross-sectional thickness and bezel size at the image display surface of the display panel, due to the top chassis.

In one or more exemplary embodiment of the display apparatus 100 according to the invention, the display panel 10 and the backlight unit 20 may be firmly fixed to each other by using the fixing sheet 30 and the coupling member 40, and thus the top chassis of the general display apparatus, may be excluded. Therefore, one or more exemplary embodiment of the display apparatus 100 according to the invention may decrease in cross-sectional thickness and bezel size when compared to the general display apparatus. Since the fixing sheet 30 and the coupling member 40 may be substituted for the top chassis and may include a metal material such as steel use stainless ("SUS") which is relatively cheap when compared to that of the general top chassis, the display apparatus 100 according to the invention decreases in manufacturing cost when compared to that of the typical display apparatus.

Figure 4:
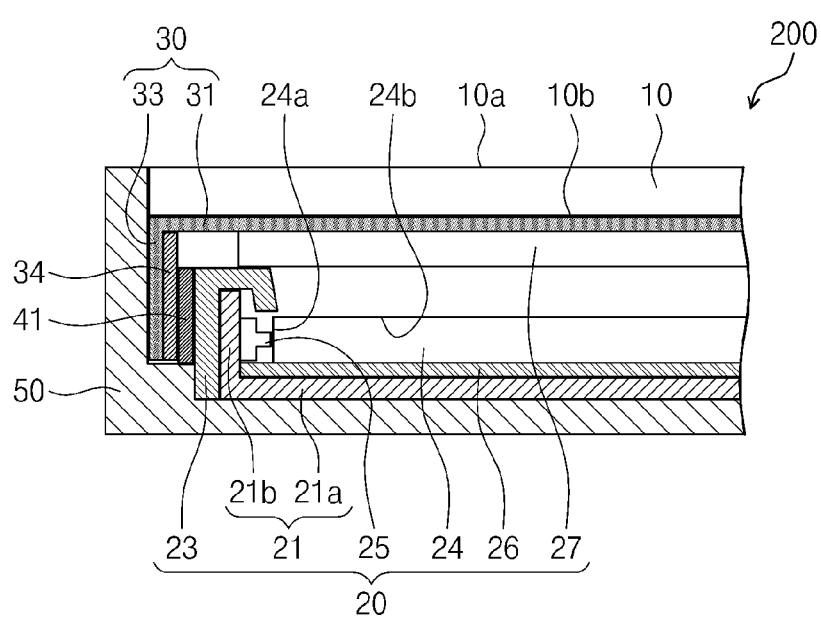
FIG. 4 is a cross-sectional view of another exemplary embodiment of a display apparatus according to the invention.

FIG. 4 is a cross-sectional view of another exemplary embodiment of a display apparatus according to the invention.

A display apparatus 200 in FIG. 4 is substantially similar to the display apparatus 100 illustrated in FIG. 1, except for the coupling member. Hereinafter, differences between the display apparatus 100 of FIG. 1 and the display apparatus 200 of FIG. 4 will be mainly described, and unexplained portions are the same as the display apparatus 100 of FIG. 1.

The coupling member 41 may be disposed between the wing part 33 and the middle mold 23. In detail, the coupling member 41 may be disposed between the stiffener 34 and the middle mold 23. The coupling member 41 may be an adhesion film configured to attach the stiffener 34 to the middle mold 23.

According to the exemplary embodiment of the display apparatus according to the invention, the display panel and the backlight unit may be firmly fixed to each other even though the top chassis is excluded. Therefore, the display apparatus may be reduced in thickness, bezel size and manufacturing cost.

Where the film-type coupling member 41 is disposed between the wing part 33 and the middle mold 23 to fix the fixing sheet 30 and to the backlight unit 20, the via holes (VH in FIG. 2) may be excluded from the fixing sheet 30 and other components such as the stiffener 34 and the middle mold 23, and manufacturing cost may be further reduced.

The above-disclosed subject matter is to be considered illustrative, and not restrictive, and the appended claims are intended to cover all such modifications, enhancements and other embodiments, which fall within the true spirit and scope of the invention. Thus, to the maximum extent allowed by law, the scope of the invention is to be determined by the broadest permissible interpretation of the following claims and their equivalents, and shall not be restricted or limited by the foregoing detailed description. Therefore, the exemplary embodiments should be considered in descriptive sense only and not for purposes of limitation.

What is claimed is:

1. A display apparatus comprising:
   a display panel comprising an image display surface on which an image is displayed, and a bottom surface opposing the image display surface;
   a backlight unit which is under the display panel and generates and provides light to the display panel;
   a fixing sheet comprising:
      a base film entirely attached to the bottom surface of the display panel and a top surface of the backlight unit, and
      a wing part extending from an edge of the base film and fixed to a side surface of the backlight unit; and
   a coupling member which couples the wing part to the side surface of the backlight unit.

2. The display apparatus of claim 1, wherein the fixing sheet comprises a transparent flexible film.

3. The display apparatus of claim 1, wherein the base film has a rectangular shape the same as that of the bottom surface of the display panel, in a plan view.

4. The display apparatus of claim 3, wherein the wing part extends from each of a plurality of sides of the rectangular shape base film and in a direction perpendicular to each side of the base film.

5. The display apparatus of claim 1, wherein the backlight unit comprises:
   a bottom chassis comprising: a bottom portion, and a sidewall extending from an edge of the bottom portion;
   a middle mold which is coupled to an outer portion of the bottom chassis and supports the display panel;
   a light guide plate which is accommodated in the bottom chassis, guides incident light from the backlight unit and emits the light toward the display panel; and
   a light source which generates and provides the light to the light guide plate.

6. The display apparatus of claim 5, wherein the wing part of the fixing sheet is fixed to the middle mold of the backlight unit.

7. The display apparatus of claim 6, further comprising a stiffener between the wing part of the fixing sheet and the middle mold of the backlight unit.

8. The display apparatus of claim 7, wherein the stiffener comprises polycarbonate.

9. The display apparatus of claim 7, wherein the coupling member comprises an adhesion film between the stiffener and the middle mold of the backlight unit.

10. The display apparatus of claim 6, wherein the coupling member passes through the wing part of the fixing sheet, and is fixed to the middle mold of the backlight unit or is fixed to the middle mold and the sidewall of the bottom chassis.

11. The display apparatus of claim 10, wherein the coupling member comprises a rivet or a screw.

12. The display apparatus of claim 5, wherein the backlight unit further comprises:
   an extrusion bar which is on the bottom portion of the bottom chassis and fixes the light source in the backlight unit; and
   an optical sheet which is supported on the middle mold of the backlight unit and overlaps the light guide plate.

13. The display apparatus of claim 1, further comprising an adhesive between the base film of the fixing sheet and the display panel, and between the base film of the fixing sheet and the backlight unit.

14. The display apparatus of claim 1, further comprising a side cover which covers a portion of a side surface of the display panel, the side surface of the backlight unit, and a bottom surface of the backlight unit.

15. The display apparatus of claim 14, wherein the side cover exposes the entire image display surface of the display panel.

16. The display apparatus of claim 1, wherein the entire image display surface of the display panel is exposed.

* * * * *